United States Patent
Swami

(10) Patent No.: US 9,929,493 B2
(45) Date of Patent: Mar. 27, 2018

(54) MULTIPOSITION GROUND/EARTH TERMINAL BLOCK FOR ELECTRICAL RECEPTACLES

(71) Applicant: APPLETON GRP LLC, Rosemont, IL (US)

(72) Inventor: Shivlingayya Vishwanath Swami, Maharashtra (IN)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 15/523,559

(22) PCT Filed: Jul. 22, 2015

(86) PCT No.: PCT/IB2015/055548
§ 371 (c)(1),
(2) Date: May 1, 2017

(87) PCT Pub. No.: WO2017/013469
PCT Pub. Date: Jan. 26, 2017

(65) Prior Publication Data
US 2017/0338581 A1    Nov. 23, 2017

(51) Int. Cl.
*H01H 9/20* (2006.01)
*H01R 13/514* (2006.01)
*B60K 37/00* (2006.01)

(52) U.S. Cl.
CPC ............ *H01R 13/514* (2013.01); *B60K 37/00* (2013.01)

(58) Field of Classification Search
CPC .............................. B60K 37/00; H01R 13/514
(Continued)

(56) References Cited

U.S. PATENT DOCUMENTS

| 1,818,290 A | * | 8/1931 | Wulle | H01R 13/707 200/50.3 |
| 4,553,000 A | * | 11/1985 | Appleton | H01R 13/629 200/50.29 |

(Continued)

OTHER PUBLICATIONS

PCT International Search Report and Written Opinion, PCT International Application No. PCT/IB2015/055548, dated Dec. 16, 2015, 7 pages.

*Primary Examiner* — Abdullah Riyami
*Assistant Examiner* — Nelson R Burgos-Guntin
(74) *Attorney, Agent, or Firm* — McDonnell Boehnen Hulbert & Berghoff LLP

(57) ABSTRACT

An electrical receptacle assembly comprising a housing defined by a first compartment and a second compartment removably securable to each other by means of fasteners. The first compartment has an operative sidewall defining a first opening and an operative base defining a second opening, wherein the first opening has hourly graduations with a corresponding first securing formation for each graduation on the operative front face of the sidewall facing the outside of the first compartment. A sleeve formation extends from the sidewall defining the first opening and surrounding the graduation. A terminal block configured to be securely fitted within the first opening. The terminal block has second securing formations complementary to the first securing formations on the first opening to enable the terminal block to be rotatably mounted in the first opening corresponding to a desired voltage rating.

6 Claims, 5 Drawing Sheets

(58) Field of Classification Search
USPC .................................. 439/170, 956, 535, 95
See application file for complete search history.

(56) References Cited

U.S. PATENT DOCUMENTS

| | | | | |
|---|---|---|---|---|
| 5,212,624 | A * | 5/1993 | Johnson | H01H 9/045 200/43.02 |
| 5,298,701 | A * | 3/1994 | Sandor | H01R 13/707 200/50.31 |
| 5,680,926 | A * | 10/1997 | Sandor | H01R 13/625 200/50.11 |
| 5,880,420 | A * | 3/1999 | Rohmer | H01R 13/707 200/50.28 |
| 6,255,607 | B1 * | 7/2001 | Miller | H01R 13/707 200/50.29 |
| 6,376,785 | B1 * | 4/2002 | Graninger | H01H 13/503 200/329 |
| 6,410,868 | B1 * | 6/2002 | Berlemont | H01R 13/707 200/50.28 |
| 6,533,588 | B1 | 3/2003 | Woith et al. | |
| 6,692,270 | B2 * | 2/2004 | Bencivenga | G05B 19/058 439/92 |
| 7,537,472 | B1 * | 5/2009 | Schwarz | H01R 13/527 439/188 |
| 9,472,908 | B2 * | 10/2016 | Shendge | H01R 13/701 |
| 2008/0139005 | A1 | 6/2008 | Guo et al. | |
| 2014/0320082 | A1 | 10/2014 | Mott et al. | |
| 2016/0156139 | A1 * | 6/2016 | Shendge | H01R 13/701 439/137 |
| 2017/0331221 | A1 * | 11/2017 | Shendge | H01R 13/58 |
| 2017/0338581 | A1 * | 11/2017 | Swami | H01R 13/514 |

* cited by examiner

MULTIPOSITION GROUND/EARTH TERMINAL BLOCK FOR ELECTRICAL RECEPTACLES

CROSS REFERENCE TO RELATED APPLICATIONS

The present application is a national stage entry of PCT/IB2015/055548, filed Jul. 22, 2015, which is incorporated herein by reference for all purposes.

FIELD

The present disclosure relates to the field of mechanical engineering. In particular, the present disclosure relates to an electrical receptacle assembly.

BACKGROUND

Definitions

Electrical receptacles are interfaced devices for attaching power lines to electrical circuits. Typically, these receptacles include connectors and terminal blocks which contain a plurality of female contacts which receive pins connected to male connectors fitted to the ends of power cables. In one embodiment, the connection is temporary where the male connector is removably fitted into the female terminal block in the receptacle.

Terminal Blocks are connecting terminals, usually of the female type, that enable fastening of the pins of male connectors within generally removably. The terminal blocks usually comprise insulating frames and clamping components for securely holding the pins of the male connectors therewithin.

Generally the receptacles are designed as per the required voltage ratings and the number of pins. These voltage ratings can range between 100 volts to 690 volts. The power cable for each voltage rating requires the male connector to have a defined number and configuration of pins (for instance, 2 phase pins+1 ground pin, 3 phase pin+1 ground pin, or 3 phase pins+1 neutral pin+1 ground pin). By convention, for different voltage ratings, the pins are arranged on the male connector in accordance with a round clock numbering at fixed hourly positions for a particular voltage rating. To match these number and configuration of pins, the female terminal block in the receptacle also has to be configured to accommodate the pins therewithin. In the conventional method of manufacture, discreet receptacles are provided for each voltage rating to suit a particular requirement of a tool or an electric circuit to which an electric supply is required. This increases the inventory of receptacles for different tools and electric circuits.

Further, in the existing receptacle arrangement, the terminal block is integral with the switch connected to the electrical circuit or tool. In the case of a surge in power or a short circuit, the switch and the terminal block is damaged, and is required to be replaced.

Objects

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a receptacle assembly that can handle multiple voltages.

Other objects and advantages of the present disclosure will be more apparent from the following description, which is not intended to limit the scope of the present disclosure.

SUMMARY

An electrical receptacle assembly comprising a housing defined by a first compartment and a second compartment removably securable to each other by means of fasteners. The first compartment having an operative sidewall defining a first opening and an operative base defining a second opening. The first opening having hourly graduations with a corresponding first securing formation for each graduation on the operative front face of the sidewall facing the outside of the first compartment. A sleeve formation extending from said sidewall defining the first opening and surrounding the graduation. A terminal block configured to be securely fitted within said first opening defining said terminal block a plurality of female contacts separated by projecting fins and second securing formations complementary to the first securing formations on the first opening to enable the terminal block to be rotatably mounted in said first opening corresponding to a desired voltage rating. The second opening configured to receive the knob of a switch. The second compartment configured to receive a switch assembly securable to said knob and outlet for leading a supply cable out of the receptacle.

The first securing formations may be in the form of protrusions, and the second securing formations may be in the form of notches, and vice-versa.

The outer wall of the contacts may also define axially extending flanges for securing the terminal block in the first opening.

The sleeve formation may be integrally moulded with the first compartment.

A hinged cover may be secured to the sleeve formation for covering the entry to the female contacts in the terminal block.

The sleeve is provided with a slot to securely receive a key formation on a male terminal connector assembly for precisely aligning the pins of the male connector assembly into the female contacts configured in the terminal block.

BRIEF DESCRIPTION OF ACCOMPANYING DRAWINGS

An electrical receptacle assembly, of the present disclosure will now be described with the help of accompanying drawings, in which.

DETAILED DESCRIPTION

Figure 1:
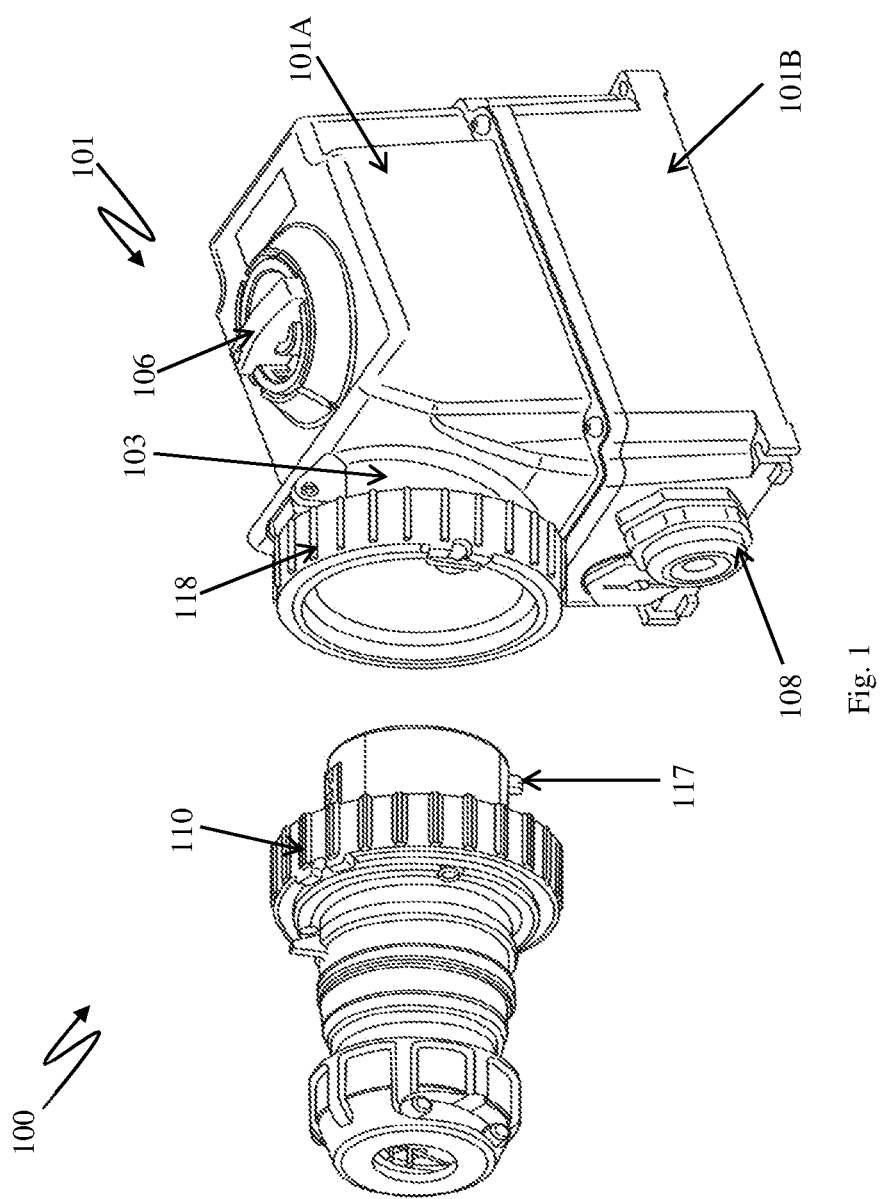
FIG. 1 illustrates an isometric view of an electrical receptacle assembly along with a male terminal connector assembly, in accordance with an embodiment of the present disclosure.

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The embodiments disclosed herein are intended merely to facilitate an understanding of ways in which the embodiments herein may be practiced and to further enable those of skill in the art to practice the embodiments herein. Accordingly, the embodiments should not be construed as limiting the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

As discussed previously, the terminal block in the conventional switch assembly is integral with the switch assembly of the conventional electrical receptacle assembly. If the terminal block of conventional electrical receptacle assembly is damaged either by short circuits or by accidental sparks, the entire switch assembly along with the terminal block has to be replaced. Therefore, the conventional electrical receptacle assemblies are less economical. Furthermore, in cases where only the terminal block is damaged and the switch assembly is not damaged, the entire switch assembly along with the terminal block has to be replaced, which is not desirable, since the switch assembly that is in working condition also needs to be discarded.

In order to overcome the above mentioned drawbacks associated with the conventional electrical receptacle assemblies, the present disclosure envisages an electrical receptacle assembly comprising a modular terminal block. More specifically, in the electrical receptacle assembly of the present disclosure, the terminal block and the switch are not integral and are two separate components. As such, in case the terminal block is damaged, there is no need to replace the switch along with the terminal block, and only the terminal block can be replaced, thereby making the electrical receptacle assembly of the present disclosure more economical, as compared with the conventional electrical receptacle assembly.

Figure 2:
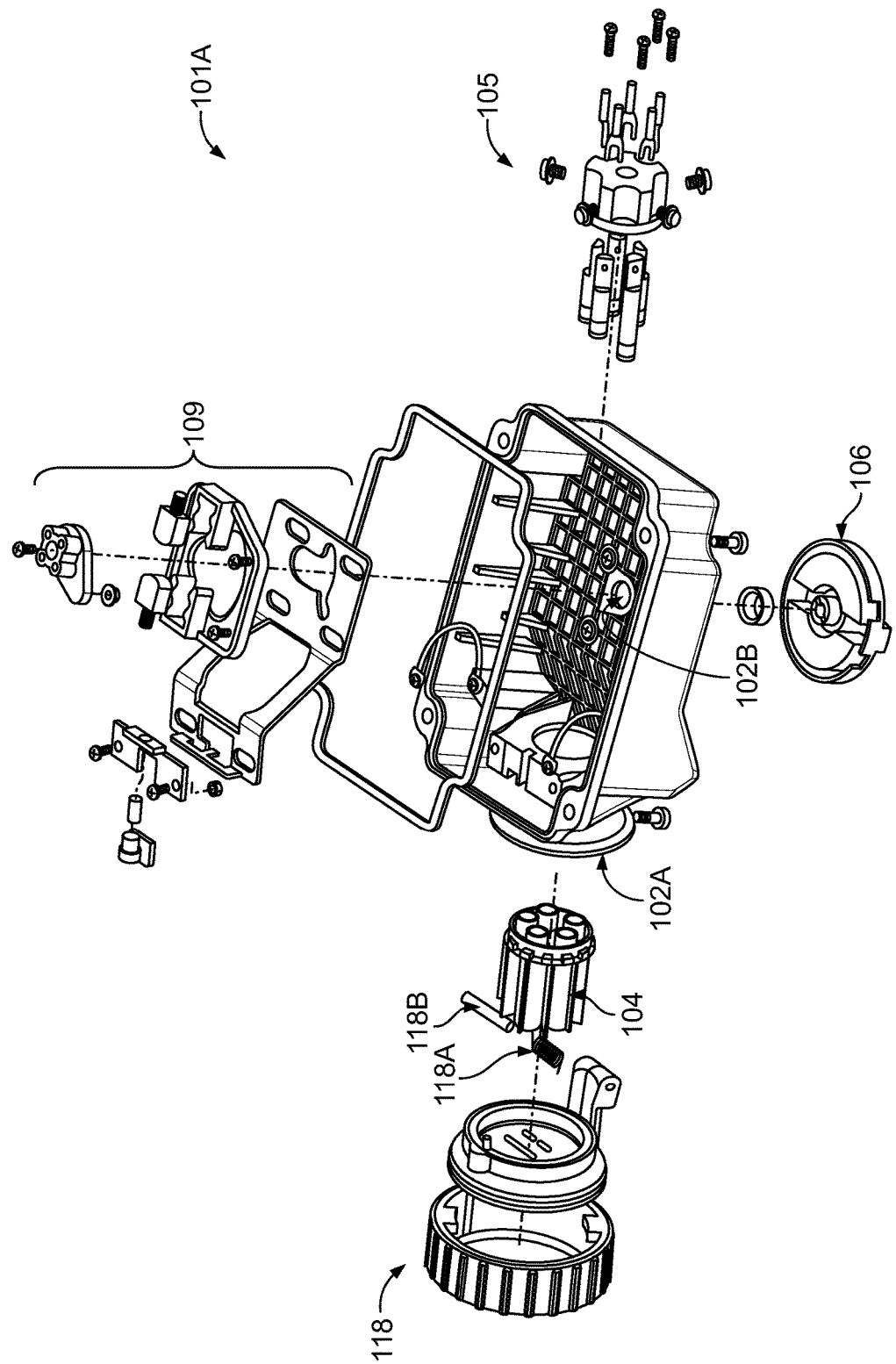
FIG. 2 illustrates an exploded isometric view of a first compartment of the electrical receptacle assembly of FIG. 1, sans the male terminal connector assembly.
Figure 3:
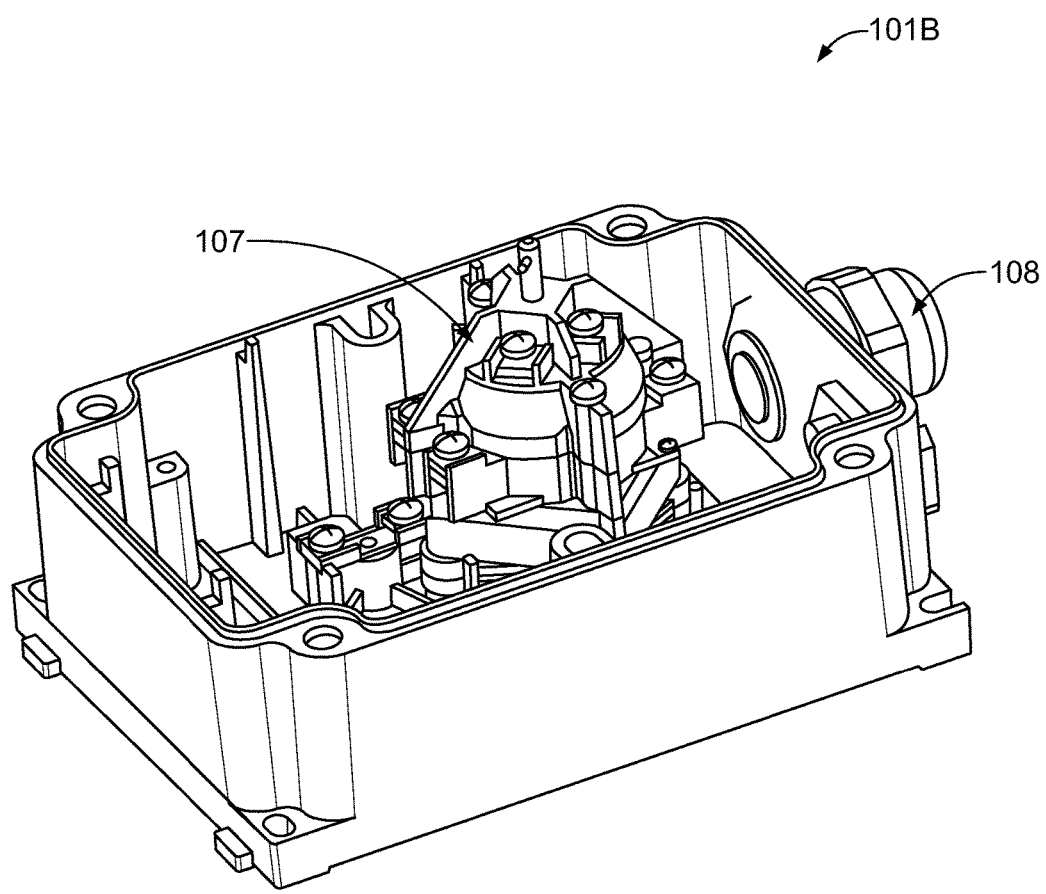
FIG. 3 illustrates an isometric view of a second compartment of the electrical receptacle assembly of FIG. 1.

An electrical receptacle assembly 100 (hereinafter referred to as receptacle assembly 100) of the present disclosure is now described with reference to FIG. 1, FIG. 2, and FIG. 3. The receptacle assembly 100 comprises a housing 101 defined by a first compartment 101A and a second compartment 101B removably securable to each other. The first compartment 101A is defined by sidewalls and a base. A first opening 102A is defined on one of the operative sidewalls of the first compartment 101A, and a second opening 102B is defined on the base of the first compartment 101A. The first opening 102A has hourly graduations (not shown in figures) with a corresponding first securing formation for each graduation on the operative front face of the sidewall facing the outside of the first compartment 101A. The receptacle assembly 100 further comprises a sleeve formation 103 extending from the sidewall defining the first opening 102A and surrounding the hourly graduations. In an embodiment, the sleeve formation 103 is integrally moulded with the first compartment 101A.

The receptacle assembly 100 further comprises a terminal block 104 configured to be securely fitted within the first opening 102A configured on the first compartment 101A. The terminal block 104 is defined by a plurality of female contacts separated by projecting fins and second securing formations complementary to the first securing formations configured on the first opening 102A. The first and the second securing formations enable the terminal block to be rotatably mounted in the first opening 102A corresponding to a desired voltage rating. The first and the second securing formations are described elaborately in the subsequent sections of the present disclosure.

The first compartment 101A further comprises terminal block connections 105 secured therewithin such that the terminals of the terminal block connections 105 are received within the plurality of female contacts of the terminal block 104. The first compartment 101A further comprises a locking mechanism 109 disposed and secured therewithin. The locking mechanism 109 facilitates the secure holding of male terminal connector assembly 110 within the sleeve formation 103. The receptacle assembly 100 further comprises a hinged cover 118 secured to the sleeve formation 103 for covering the entry to the female contacts in the terminal block 104. The hinged action of the hinged cover 118 is achieved by means of a spring 118A and a pin 118B.

The second opening 102B is configured to receive the knob 106 of a switch assembly 107. The switch assembly 107 is configured to be received within the second compartment 101B of the housing 101. The switch assembly 107 is securable to the knob 106. The receptacle assembly 100 further comprises an outlet 108 for leading a supply cable, configured in the second compartment 101B. Furthermore, the switch assembly 107 is in electrical communication with the terminal block connections 105, whose terminals are received within the plurality of female contacts of the terminal block 104.

Figure 4A:
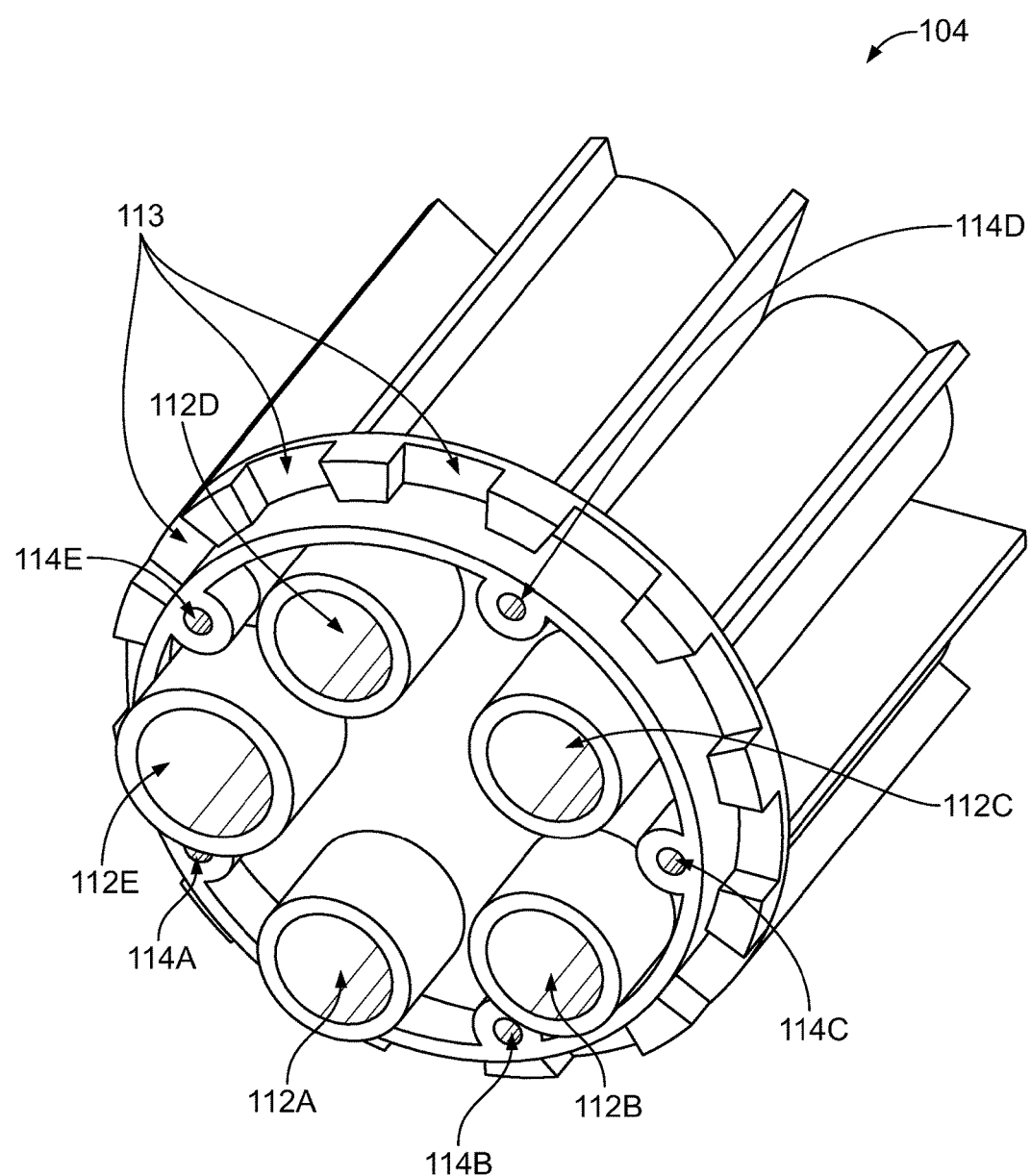
FIG. 4A illustrates an isometric view of a terminal block used in the electrical receptacle assembly of FIG. 1.
Figure 4B:
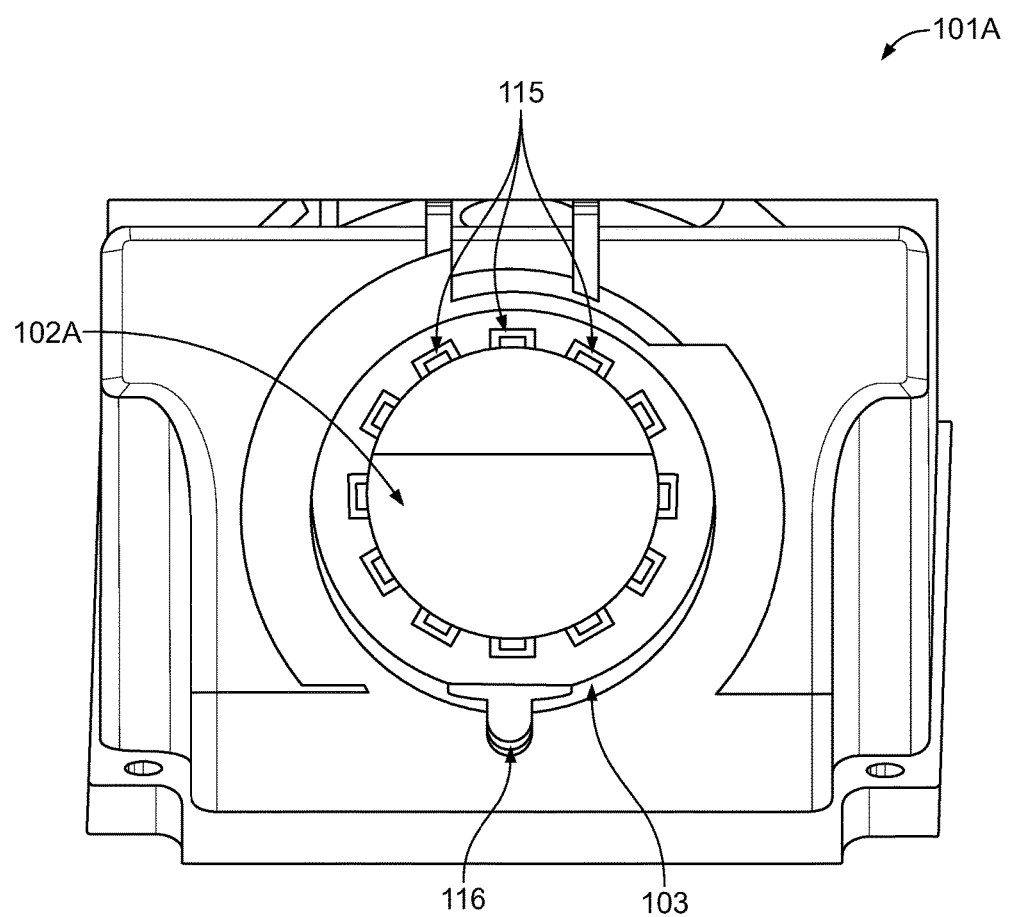
FIG. 4B illustrates a top view of a sleeve formation of the first compartment of the electrical receptacle assembly of FIG. 1.

FIG. 4A and FIG. 4B explain the rotation mechanism of the terminal block 104 within the sleeve formation 103. The terminal block 104 of the present embodiment is a female terminal block, i.e., it is adapted to receive the pins of the male terminal connector assembly 110. The terminal block 104 has a plurality of female contacts 112A-112E. The female contacts 112A-112E are adapted to receive the pins of the male terminal connector assembly 110 from one end. The terminals of the terminal block connections 105 are received in the female contacts 112A-112E from the other end, thereby enabling electrical communication between the switch assembly 107 and the male terminal connector assembly 110. The terminal block 104 further comprises second securing formations 113. In the present embodiment, the second securing formations 113 are notches. However, the second securing formations 113 are not limited to being notches. In another embodiment, the second securing formations 113 can also be protrusions. The outer wall of the contacts defines axially extending flanges 114A-114E for securing the terminal block 104 within the first opening 102A.

The first opening 102A is clearly seen in FIG. 4B. The first securing formations 115 are configured along the periphery of the first opening 102A on the operative front face of the sidewall facing outside of the first compartment 101A. In the present embodiment, the first securing formations 115 are protrusions. However, the first securing formations 115 are not limited to being protrusions. In another embodiment, the first securing formations 115 can also be notches.

The first securing formations 115 are engageable with the second securing formations 113 configured on the terminal block 104. In order to obtain a certain h-position (position corresponding to a certain graduation of the hourly graduations) of the ground terminal, the terminal block 104 is unfastened, disassembled, and removed from the first opening 102A. After removal from the first opening 102A, the terminal block 104 is rotated to obtain the desired h-position of the ground terminal and inserted again in the first opening 102A. Subsequent to this, the first securing formations 115 and the second securing formations 113 engage with each other, thereby obtaining the desired h-position of the ground terminal and locking any further rotation of the terminal block 104. The terminal block 104 is then fastened to the first compartment 101A via the flanges 114A-114E to prevent the terminal block 104 from slipping out of the first opening 102A of the first compartment 101A.

As seen in FIG. 4B, the sleeve formation 103 is provided with a slot 116 that receives a key 117 configured on the male terminal connector assembly 110 to precisely align the pins of the male connector assembly into the female contacts 112A-112E configured in the terminal block 104.

Technical Advances and Economical Significance

The electrical receptacle assembly of the present disclosure described herein above has several technical advantages including but not limited to the realization of an electrical receptacle assembly:

can handle multiple voltages.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An electrical receptacle assembly comprising:
a housing defined by a first compartment and a second compartment removably securable to each other by means of fasteners, said first compartment having an operative sidewall defining a first opening and an operative base defining a second opening, wherein said first opening having hourly graduations with a corresponding first securing formation for each graduation on the operative front face of the sidewall facing the outside of said first compartment;
a sleeve formation extending from said sidewall defining the first opening and surrounding the graduation;
a terminal block configured to be securely fitted within said first opening, defining said terminal block are a plurality of female contacts separated by projecting fins and second securing formations complementary to said first securing formations on said first opening to enable the terminal block to be rotatably mounted in said first opening corresponding to a desired voltage rating, and said second opening configured to receive the knob of a switch assembly configured to be received within said second compartment, said switch assembly securable to said knob; and
an outlet for leading a supply cable out of said housing.

2. The assembly as claimed in claim 1, wherein first securing formations are in the form of protrusions, and the second securing formations are in the form of notches.

3. The assembly as claimed in claim 1, wherein first securing formations are in the form of notches, and the second securing formations are in the form of protrusions.

4. The assembly as claimed in claim 1, wherein the outer wall of the contacts defines axially extending flanges for securing said terminal block in said first opening.

5. The assembly as claimed in claim 1, wherein the sleeve formation is integrally moulded with said first compartment.

6. The assembly as claimed in claim 1, further comprising a hinged cover secured to said sleeve formation for covering the entry to the female contacts in said terminal block.

* * * * *